UNITED STATES PATENT OFFICE.

EMMANUEL ANDRÉ BOURCART, OF PARIS, FRANCE, ASSIGNOR, BY MESNE ASSIGNMENTS, TO COMPAGNIE NATIONALE DE MATIERES COLORANTES ET DE PRODUITS CHIMIQUES, OF PARIS, FRANCE, A CORPORATION OF FRANCE.

MANUFACTURE OF INDOXYL, ITS HOMOLOGUES AND THEIR DERIVATIVES.

1,293,680.   Specification of Letters Patent.   Patented Feb. 11, 1919.

No Drawing. Application filed August 1, 1916, Serial No. 112,589. Renewed October 10, 1918. Serial No. 257,663.

*To all whom it may concern:*

Be it known that I, EMMANUEL ANDRÉ BOURCART, of 2 Rue Blanche, Paris, France, chemist, have invented new and useful Improvements in the Manufacture of Indoxyl, its Homologues and Their Derivatives, which improvements are fully set forth in the following specification.

The manufacture of synthetic indigo by the fusion of phenyl glycin with caustic potash as proposed by Heumann has not proved commercially practicable because the maximum yield obtained is 10% of the weight of the glycin.

Friedlander suggests (*Fortschritte der Theerfarben-Industrie*, 2nd part, page 100) that the poor yield is due to the fact that the caustic alkalis destroy the indoxyl formed and break up the glycin before it undergoes transformation into indoxyl.

In order to prevent this decomposition powerful dehydrating agents, such as sodium nitrid, have been added to the caustic alkali. These assist the reaction and allow the temperature of the melt to be reduced below that which had to be employed when caustic alkalis alone were used.

This use of the alkalis and their alloys, the hydrids, nitrids, alkali alcoholates, alkaline earths, their oxids and carbid of calcium at temperatures ranging between 190° and 280° centigrade has increased the yield so that some of the processes have been worked commercially.

However, though the yield of indoxyl may be as much as 50% of the weight of the glycin, the results are negatived by the facility with which the glycin is decomposed at the temperatures at which it should be introduced into the caustics. Moreover, in these processes a larger or smaller quantity of monomethylanilin is always produced which shows that it is to this secondary reaction that the bad yield is due.

The present invention relates to a new process by which the arylglycinates or their derivatives are quickly transformed into indoxyl without the formation of undesirable by-products. The process is based upon the discovery that arylglycinates and their derivatives are transformed theoretically into the corresponding indoxyls without undergoing decomposition if they are fused with inorganic substances capable of decomposing water in the presence of dehydrated sodium and potassium hydroxids and if the operation is effected in an autoclave at a pressure of six to ten atmospheres.

By effecting the operation in an autoclave I achieve, besides the advantage of preventing the decomposition of the arylglycinates, the further advantage that the introduction thereof into the autoclave is not hindered by frothing. When the process is carried on at ordinary pressure frothing greatly prolongs the contact of the arylglycinates and the indoxyl with the caustic at an undesirable temperature. By working under pressure the process of fusing is shortened and the indoxyl may be transformed into indigo before it is decomposed.

Example.

Into an autoclave fitted with a stirrer is first introduced a dehydrated and heated mixture of 70 parts caustic potash and 30 parts caustic soda to which is added 30 parts of sodium amid. The pressure in the autoclave is raised preferably to six to ten kilos by means of ammonia or anilin vapors. When the temperature has fallen to 180°, 50 parts of potassium phenylglycinate are introduced as quickly as possible while the temperature is prevented from rising substantially above 190° centigrade. The reaction is immediate and as soon as the evolution of ammonia has ceased, the melt is dissolved in iced water and the indigo is precipitated by the usual methods.

Where the term "ammonia" is used in the claims, it is to be understood that anilin is the full equivalent for the purpose of this invention.

Claims.

1. In the manufacture of synthetic indigo, the steps consisting in subjecting an arylglycinate to the action of a fused mixture containing an alkali metal hydroxid and a water decomposing agent in an atmosphere of ammonia under pressure of about 6-10 atmospheres.

2. In the manufacture of synthetic indigo, the steps consisting in subjecting potassium phenylglycinate to the action of a fused mixture of sodium and potassium hydroxids and sodium amid, in an atmosphere of ammonia gas at a pressure of about 6-10 atmospheres.

3. In the manufacture of synthetic indigo, the steps consisting in subjecting potassium phenylglycinate to the action of a fused mixture of sodium and potassium hydroxids and sodium amid, in an atmosphere of ammonia gas at a pressure above atmospheric pressure.

In testimony whereof I have signed this specification in the presence of two subscribing witnesses.

EMMANUEL ANDRÉ BOURCART.

Witnesses:
GASTON DE MESTRAL,
TRACY LAY.